United States Patent
Han et al.

(10) Patent No.: US 11,614,003 B2
(45) Date of Patent: Mar. 28, 2023

(54) COMBINED COOLING, HEATING AND POWER SYSTEM

(71) Applicant: SHANDONG UNIVERSITY, Shandong (CN)

(72) Inventors: Jitian Han, Jinan (CN); Yang Liu, Jinan (CN); Huailiang You, Jinan (CN); Lian Duan, Jinan (CN); Li Shao, Jinan (CN); Changnian Chen, Jinan (CN); Zeting Yu, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 176 days.

(21) Appl. No.: 16/976,535

(22) PCT Filed: Nov. 26, 2018

(86) PCT No.: PCT/CN2018/117515
§ 371 (c)(1),
(2) Date: Nov. 25, 2020

(87) PCT Pub. No.: WO2019/165807
PCT Pub. Date: Sep. 6, 2019

(65) Prior Publication Data
US 2021/0087949 A1     Mar. 25, 2021

(30) Foreign Application Priority Data

Feb. 28, 2018   (CN) .......................... 201810168997.X

(51) Int. Cl.
*F02C 7/224*     (2006.01)
*F02C 1/00*      (2006.01)
(Continued)

(52) U.S. Cl.
CPC .............. *F01K 23/10* (2013.01); *F01K 9/003* (2013.01); *F01K 23/02* (2013.01); *F01K 23/08* (2013.01);
(Continued)

(58) Field of Classification Search
CPC .... F02C 1/10; F02C 1/007; F02C 1/06; F02C 7/224; F02C 6/18; F02C 1/08;
(Continued)

(56) References Cited

U.S. PATENT DOCUMENTS

2018/0094550 A1*   4/2018   Conlon ..................... F02C 6/00

FOREIGN PATENT DOCUMENTS

CN     102088099 A      6/2011
CN     201909409 U  *   7/2011
(Continued)

OTHER PUBLICATIONS

Wang Xurong_Exergy and exergoeconomic analyses of a supercritical CO2 cycle for a cogeneration application. Publication Date: Nov. 15, 2016. Energy 119 (2017) 971e982 (Year: 2016).*

(Continued)

*Primary Examiner* — Stephanie Sebasco Cheng
*Assistant Examiner* — Jingchen Liu
(74) *Attorney, Agent, or Firm* — Oliff PLC

(57) ABSTRACT

A combined cooling, heating and power system is formed by integrating a $CO_2$ cycle subsystem, an ORC cycle subsystem, and an LNG cold energy utilization subsystem based on an SOFC/GT hybrid power generation subsystem. The combined system can achieve efficient and cascade utilization of energy and low carbon dioxide emission. An SOFC/GT hybrid system is used as a prime mover. High-, medium-, and low-temperature waste heat of the system are recovered through $CO_2$ and ORC cycles, respectively. Cold energy (for air conditioning and refrigeration), heat, power, natural gas, (Continued)

ice, and dry ice can be provided by using LNG as a cold source of the $CO_2$ and ORC cycles. Low $CO_2$ emission is achieved by condensation and separation of $CO_2$ from flue gas, so energy loss of the system can be reduced, and efficient and cascade utilization of energy can be achieved, thereby realizing energy conservation and emission reduction.

8 Claims, 1 Drawing Sheet

(51) Int. Cl.

| | | |
|---|---|---|
| *F02C 1/06* | (2006.01) | |
| *F01K 23/10* | (2006.01) | |
| *F01K 7/32* | (2006.01) | |
| *F01K 25/10* | (2006.01) | |
| *F02C 6/18* | (2006.01) | |
| *F01K 9/00* | (2006.01) | |
| *F01K 23/08* | (2006.01) | |
| *F01K 23/02* | (2006.01) | |
| *F01K 23/04* | (2006.01) | |

(52) U.S. Cl.
CPC .......... *F01K 23/103* (2013.01); *F01K 25/103* (2013.01); *F02C 1/007* (2013.01); *F02C 7/224* (2013.01); *F01K 23/04* (2013.01); *F01K 25/10* (2013.01); *F01N 2570/10* (2013.01); *F02C 1/06* (2013.01); *F02C 6/18* (2013.01); *F05D 2220/76* (2013.01); *F05D 2270/08* (2013.01); *F23J 2215/50* (2013.01); *F23J 2900/15061* (2013.01); *Y02E 20/14* (2013.01); *Y02E 20/16* (2013.01); *Y02E 20/32* (2013.01); *Y02E 60/50* (2013.01)

(58) Field of Classification Search
CPC .......... F02C 1/106; F02C 3/20; F01K 25/103; F01K 7/32; F01K 25/08; F05D 2270/08; F05D 2260/61–611; F23J 2900/15061; F23J 219/70; F23J 2220/40; F23J 2220/66; F23J 3/0266; F23J 3/067; B01D 7/00–02

See application file for complete search history.

(56) References Cited

FOREIGN PATENT DOCUMENTS

| | | | | |
|---|---|---|---|---|
| CN | 102628402 | A | * | 8/2012 |
| CN | 102628402 | A | | 8/2012 |
| CN | 102967099 | A | * | 3/2013 |
| CN | 103161607 | A | * | 6/2013 |
| CN | 205641713 | U | * | 10/2016 |
| CN | 106499454 | A | | 3/2017 |
| CN | 106703918 | A | | 5/2017 |
| CN | 106839563 | A | * | 6/2017 .......... B01D 5/0039 |
| CN | 108506110 | A | | 9/2018 |

OTHER PUBLICATIONS

CAA, Parallel Flow Condensers for Your vintage auto air Conditioning, 2014 (Year: 2014).*

Yue Cao, Thermodynamic analysis and optimization of a gas turbine and cascade CO2 combined cycle, Apr. 27, 2017 (Year: 2017).*

Oddmar Eiksund, Optimization of Pure-Component LNG Cascade Processes with Heat Integration, Jan. 15, 2018 (Year: 2018).*

Feb. 19, 2019 International Search Report issued in International Patent Application No. PCT/CN2018/117515.

Feb. 19, 2019 Written Opinion of the International Searching Authority issued in International Patent Application Mo. PCT/CN2018/117515.

* cited by examiner

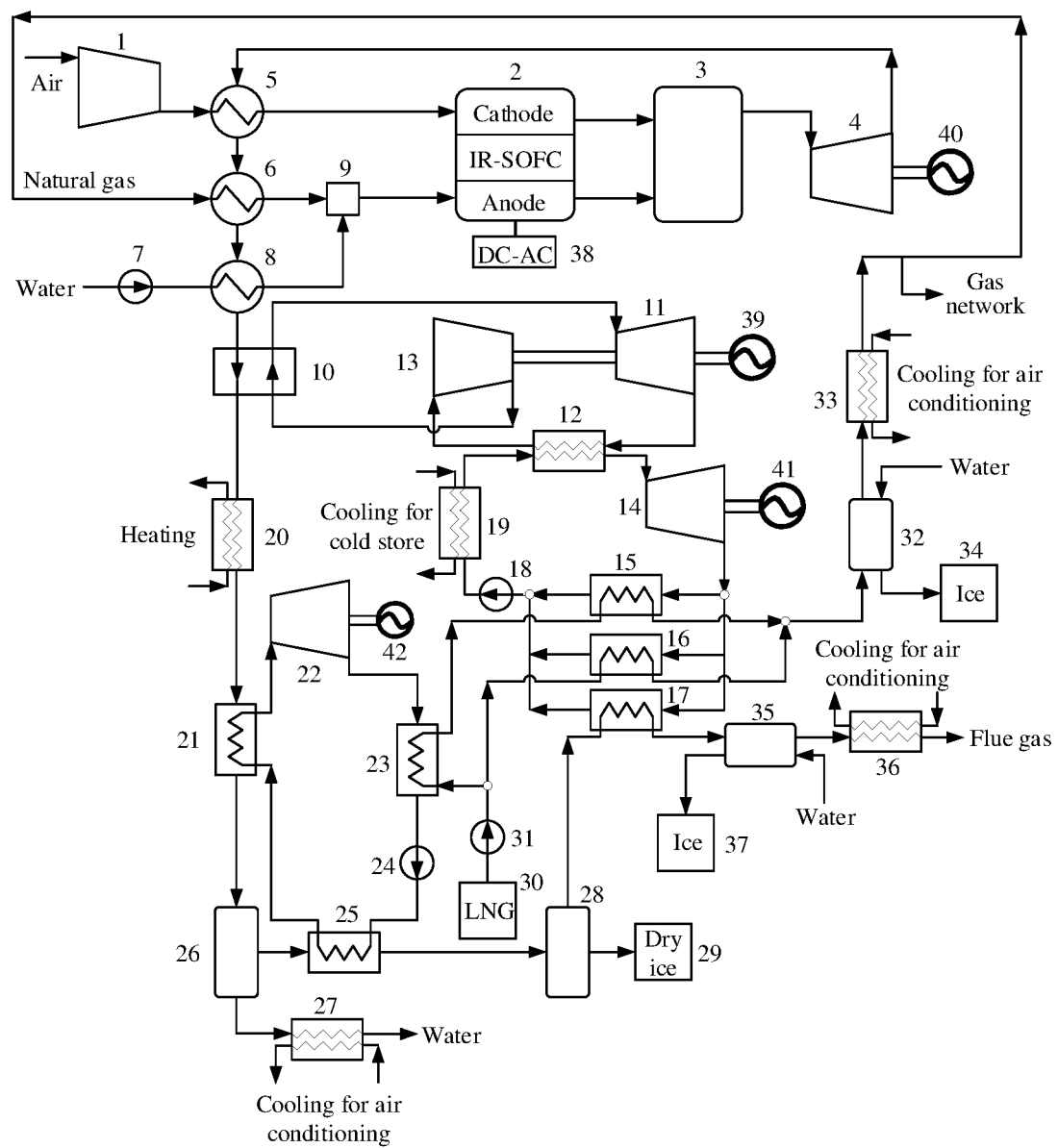

COMBINED COOLING, HEATING AND POWER SYSTEM

BACKGROUND

Technical Field

The present invention relates to a combined cooling, heating and power system.

Related Art

Solid oxide fuel cell (SOFC) is an efficient energy conversion device that directly converts chemical energy stored in fuel to electric energy through an electrochemical reaction. The solid oxide fuel cell has an energy conversion process unrestricted by the Carnot cycle, and therefore has higher power generation efficiency. It also has the advantages of a modular structure, low pollutant emissions, and strong fuel adaptability, etc. An SOFC/GT hybrid power generation system consisting of the SOFC and a gas turbine (GT) is considered to be a feasible solution to achieve the goal of fuel flexibility, multiple products, ultra-high conversion efficiency, and low pollutant emissions. Due to the high operating temperature of the SOFC/GT hybrid power generation system, the waste heat energy of its exhaust gas could be recovered by constructing a combined cooling, heating and power system, thus effective and cascade utilization of energy can be achieved. Existing studies show that, compared to the organic Rankine cycle (ORC) and the air Brayton cycle, the $CO_2$ cycle has higher power generation efficiency, and has a bright future in the fields of waste heat recovery, solar energy utilization, nuclear reactor, etc. At present, in power generation systems integrating SOFC/GT and $CO_2$ cycle, there is still room for improvement in the power generation efficiency of the $CO_2$ cycle system equipped with a conventional cold source. In the existing $CO_2$ cycle system using a liquefied natural gas (LNG) as the cold source, although the power generation efficiency of the system may be effectively improved, a large exergy loss is caused, and the system should be improved to reduce the exergy loss. Therefore, a combined cooling, heating and power system consisting of SOFC/GT/$CO_2$ and ORC cycles and an LNG cold energy utilization system can achieve effective and cascade utilization of energy and reduction in carbon emission.

SUMMARY

In view of problems in the foregoing prior art, an objective of the present invention is to provide a combined cooling, heating and power system based on SOFC/GT/$CO_2$ and ORC combined cycle power generation and LNG cold energy utilization. A distributed combined cooling, heating and power system is built by introducing a $CO_2$ cycle, an ORC cycle, and an LNG cold source on the basis of an SOFC/GT hybrid power generation system, which could provide cooling, heating, power, natural gas, ice and dry ice to consumers. In addition, the exergy loss and $CO_2$ emission could be reduced with effective and cascade utilization of energy.

In order to resolve the foregoing technical problems, a technical solution of the present invention is:

a combined cooling, heating and power system based on SOFC/GT/$CO_2$ and ORC combined cycle power generation and LNG cold energy utilization, including: an SOFC/GT hybrid power generation subsystem, a $CO_2$ cycle subsystem, an ORC cycle subsystem, an LNG cold energy utilization subsystem, a heating subsystem, a $CO_2$ capture and cooling (air conditioning) subsystem.

The SOFC/GT hybrid power generation subsystem consists of an air compressor, a first preheater, an SOFC, a second preheater, a water pump, a third preheater, a mixer, an inverter, an afterburner, a gas turbine, and a second electric generator.

The air compressor and the first preheater are connected in series and are then connected to the cathode of the SOFC; the water pump is connected to the third preheater, the second preheater and the third preheater are connected to the mixer, and the mixer is connected to the anode of the SOFC; the SOFC is connected to the inverter to convert direct current to alternating current; exhaust from the cathode and exhaust from the anode of the SOFC enter the afterburner; high-temperature exhaust from the afterburner expands through the gas turbine to do work to drive the second electric generator to generate electricity; and exhaust from the gas turbine enters the first preheater, the second preheater, and the third preheater in sequence to preheat air, fuel, and water, respectively;

The $CO_2$ cycle subsystem is divided into a supercritical $CO_2$ cycle ($SCO_2$ cycle) and a transcritical $CO_2$ cycle ($TCO_2$ cycle).

The $SCO_2$ cycle consists of a waste heat boiler, a first electric generator, an $SCO_2$ turbine, a gas cooler, and an $SCO_2$ compressor.

Exhaust from the third preheater enters the waste heat boiler to heat working fluid $CO_2$; the heated working fluid $CO_2$ enters an $SCO_2$ turbine of a supercritical $CO_2$ cycle ($SCO_2$ cycle) to do work to drive the first electric generator to generate electricity; exhaust from the $SCO_2$ turbine enters a gas cooler to heat the working fluid $CO_2$ in a transcritical $CO_2$ cycle ($TCO_2$ cycle); and exhaust from the gas cooler in the $SCO_2$ cycle enters the $SCO_2$ compressor for compression and is then fed into the waste heat boiler for reheating, thus completing a supercritical $CO_2$ cycle.

The $TCO_2$ cycle consists of a gas cooler, a $TCO_2$ turbine, a third electric generator, a first condenser, a second condenser, a third condenser, a working fluid $CO_2$ pump, and a precooler.

The working fluid $CO_2$ in the $TCO_2$ cycle is heated in the gas cooler and enters the $TCO_2$ turbine to do work to drive the third electric generator to generate electricity; exhaust from the $TCO_2$ turbine is condensed in the first condenser, the second condenser, and the third condenser; the first condenser, the second condenser, and the third condenser are connected to the working fluid $CO_2$ pump, and the working fluid $CO_2$ from an outlet of the working fluid $CO_2$ pump enters the precooler to provide cooling for a low-temperature cold store; and the working fluid $CO_2$ from the outlet of the precooler enters the gas cooler and is heated by the working fluid $CO_2$ in the $SCO_2$ cycle, thus completing a transcritical $CO_2$ cycle.

The heating subsystem includes a first heat exchanger, and flue gas from the outlet of the waste heat boiler enters the first heat exchanger to heat the outside.

The working fluid of the ORC cycle subsystem is R1150; and the ORC cycle subsystem consists of a first heat exchanger, an evaporator, an R1150 turbine, a fourth electric generator, an R1150 condenser, a working fluid R1150 pump, and a second heat exchanger.

Flue gas from an outlet of the first heat exchanger enters the evaporator to heat the working fluid R1150 in the ORC cycle; the working fluid R1150 from an outlet of the evaporator enters the R1150 turbine to do work to drive the} fourth electric generator to generate electricity; exhaust from the R1150 turbine is condensed in the R1150 condenser; the R1150 condenser is connected to the working fluid R1150 pump, and the working fluid R1150 from an outlet of the working fluid R1150 pump enters the second heat exchanger for heating; and the working fluid R1150 discharged from the second heat exchanger enters the evaporator to absorb heat and evaporate, so that one working fluid R1150 cycle is completed.

The $CO_2$ capture and air conditioning cooling subsystem consists of an evaporator, a first separator, a first air conditioning cooler, a second heat exchanger, a second separator, a dry ice container, a third condenser, a third heat exchanger, a second air conditioning cooler, and a first ice container, flue gas from the outlet of the evaporator enters the first separator, flue gas is separated from water in the first separator, water enters the first air conditioning cooler to cool the outside, the flue gas enters the second heat exchanger to be cooled by working fluid R1150, and the $CO_2$ gas is condensed into dry ice.

Flue gas from the outlet of the second heat exchanger enters the second separator, the flue gas is separated from the dry ice in the second separator, the dry ice is stored in the dry ice container, and the flue gas enters the third condenser to condense the working fluid $CO_2$.

Flue gas from the outlet of the third condenser enters the third heat exchanger to condense the water, and ice formed is stored in the first ice container; and flue gas from the outlet of the third heat exchanger enters the second air conditioning cooler to cool the outside and is then discharged into the atmosphere.

The LNG cold energy utilization subsystem consists of an LNG tank, an LNG pump, an R1150 condenser, a first condenser, a second condenser, a fourth heat exchanger, a second ice container, and a third air conditioning cooler.

The LNG tank is connected to the LNG pump, LNG from the outlet of the LNG pump is divided into two parts: one part enters the R1150 condenser and the first condenser in sequence, and the other part enters the second condenser, the two parts of natural gas merge after flowing out of the outlet of the first condenser and the outlet of the second condenser, respectively, and enter the fourth heat exchanger to condense water, and ice formed is stored in the second ice container; natural gas from the outlet of the fourth heat exchanger enters the third air conditioning cooler to cool the outside; and a part of natural gas from the outlet of the third air conditioning cooler is fed into the second preheater as fuel for preheating, and excess natural gas is supplied to a gas network.

Beneficial Effects of the Present Invention:

According to the present invention, an SOFC is used as a prime mover, high-temperature waste heat, medium-temperature waste heat, and low-temperature waste heat are recovered through the gas turbine, the $CO_2$ cycle, and the ORC cycle, respectively, and LNG is used as a cold source of the $CO_2$ cycle and the ORC cycle, reducing exergy loss and achieving efficient and cascade utilization of energy, providing cold energy (for an air-conditioner and a low-temperature cold store), heat, power, natural gas, ice, and dry ice to the outside, and achieving low carbon emission of the system by separation of $CO_2$ from the flue gas.

BRIEF DESCRIPTION OF THE DRAWINGS

The drawings of the specification forming a part of the present application are used to further understand the present application. Exemplary embodiments of the present application and descriptions thereof are used to explain the present application, and do not constitute an improper limitation of the application.

FIG. 1 is a schematic diagram of constitution of a combined cooling, heating and power system based on SOFC/GT/$CO_2$ and ORC combined cycle power generation and LNG cold energy utilization.

1. Air compressor; 2. SOFC; 3. afterburner; 4. gas turbine; 5. first preheater; 6. second preheater; 7. water pump; 8. third preheater; 9. mixer; 10. waste heat boiler; 11. $SCO_2$ turbine; 12. gas cooler; 13. $SCO_2$ compressor; 14. $TCO_2$ turbine; 15. first condenser; 16. second condenser; 17. third condenser; 18. working fluid $CO_2$ pump; 19. precooler; 20. first heat exchanger; 21. evaporator; 22. R1150 turbine; 23. R1150 condenser; 24. working fluid R1150 pump; 25. second heat exchanger; 26. first separator; 27. first air conditioning cooler; 28. second separator; 29. dry ice container; 30. LNG tank; 31. LNG pump; 32. fourth heat exchanger; 33. third air conditioning cooler; 34. second ice container; 35. third heat exchanger; 36. second air conditioning cooler; 37. first ice container; 38. inverter; 39. first electric generator; 40. second electric generator; 41. third electric generator; 42. fourth electric generator

DETAILED DESCRIPTION

It is to be noted that the following detailed descriptions are all exemplary and are intended to provide a further understanding of this application. Unless otherwise specified, all technical and scientific terms used herein have the same meaning as commonly understood by those of ordinary skill in the art to which this application belongs.

It should be noted that terms used herein are only for the purpose of describing specific implementations and are not intended to limit the exemplary implementations of this application. As used herein, the singular form is also intended to include the plural form unless the context clearly dictates otherwise. In addition, it should be further understood that, terms "comprise" and/or "include" used in this specification indicate that there are features, steps, operations, devices, components, and/or combinations thereof.

As shown in FIG. 1, an air compressor 1 and a first preheater 5 are connected in series and then connected to the cathode of an SOFC 2.

A water pump 7 is connected to a third preheater 8, a second preheater 6 and the third preheater 8 are connected to a mixer 9, and the mixer 9 is connected to the anode of the SOFC 2.

An SOFC 2 stack is connected to an inverter 38 to convert direct current to alternating current. Exhaust from the cathode and exhaust from the anode of the SOFC 2 enters an afterburner 3.

High-temperature exhaust from the afterburner 3 enters a gas turbine 4 to do work to drive an electric generator to generate electricity.

Exhaust from the gas turbine 4 enters the first preheater 5, the second preheater 6, and the third preheater 8 in sequence to preheat air, fuel, and water, respectively.

Exhaust from the third preheater 8 enters a waste heat boiler 10 to heat working fluid $CO_2$. The heated working fluid $CO_2$ enters an $SCO_2$ turbine 11 of a supercritical $CO_2$ cycle ($SCO_2$ cycle) to do work to drive the electric generator to generate electricity. Exhaust from the $SCO_2$ turbine 11 enters a gas cooler 12 to heat the working fluid $CO_2$ in a transcritical $CO_2$ cycle ($TCO_2$ cycle). Exhaust from the gas cooler 12 in the $SCO_2$ cycle enters an $SCO_2$ compressor 13 for compression and is then fed into the waste heat boiler 10 for reheating, thus completing a supercritical $CO_2$ cycle.

A working fluid $CO_2$ in the $TCO_2$ cycle is heated in the gas cooler 12 and enters the $TCO_2$ turbine 14 to do work to drive the electric generator to generate electricity. Exhaust from the $TCO_2$ turbine 14 is condensed in a first condenser 15, a second condenser 16, and a third condenser 17. The first condenser 15, the second condenser 16, and the third condenser 17 are connected to a working fluid $CO_2$ pump 18, and the working fluid $CO_2$ from the outlet of the working fluid $CO_2$ pump 18 enters a precooler 19 to cool a low-temperature cold store. The working fluid $CO_2$ from the outlet of the precooler 19 enters the gas cooler 12 and is heated by the working fluid $CO_2$ in the $SCO_2$ cycle, so that one transcritical $CO_2$ cycle is completed.

Flue gas from the outlet of the waste heat boiler 10 enters a first heat exchanger 20 to heat the outside.

Flue gas from the outlet of the first heat exchanger 20 enters an evaporator 21 to heat working fluid R1150 in the ORC cycle. The working fluid R1150 from the outlet of the evaporator 21 enters an R1150 turbine 22 to do work to drive an electric generator to generate electricity. Exhaust from the R1150 turbine 22 is condensed in an R1150 condenser 23. The R1150 condenser 23 is connected to a working fluid R1150 pump 24, and the working fluid R1150 from the outlet of the working fluid R1150 pump 24 enters a second heat exchanger 25 for heating. The working fluid R1150 discharged from the second heat exchanger 25 enters the evaporator 21 to absorb heat and evaporate, so that one working fluid R1150 cycle is completed.

Flue gas from the outlet of the evaporator 21 enters a first separator 26, flue gas is separated from water in the first separator 26, water enters a first air conditioning cooler 27 to cool the outside, the flue gas enters the second heat exchanger 25 to be cooled by the working fluid R1150, and the $CO_2$ gas is condensed into dry ice.

Flue gas from the outlet of the second heat exchanger 25 enters a second separator 28, the flue gas is separated from the dry ice in the second separator 28, the dry ice is stored in a dry ice container 29, and the flue gas enters the third condenser 17 to condense the working fluid $CO_2$.

Flue gas from the outlet of the third condenser 17 enters a third heat exchanger 35 to condense the water, and ice formed is stored in a first ice container 37. Flue gas from the outlet of the third heat exchanger 35 enters a second air conditioning cooler 36 to cool the outside and is then discharged into the atmosphere.

An LNG tank 30 is connected to an LNG pump 31. LNG from the outlet of the LNG pump 31 is divided into two parts: one part enters the R1150 condenser 23 and the first condenser 15 in sequence, and the other part enters the second condenser 16. The two parts of natural gas merge after flowing out of the outlet of the first condenser 15 and the outlet of the second condenser 16, respectively, and enter a fourth heat exchanger 32 to condense water, and ice formed is stored in a second ice container 34. Natural gas from the outlet of the fourth heat exchanger 32 enters a third air conditioning cooler 33 to cool the outside. A part of natural gas from the outlet of the third air conditioning cooler 33 is fed into a second preheater 6 as a fuel for preheating, and the remaining part of natural gas is supplied to a gas network.

Initial conditions and system simulation results of a combined cooling, heating and power system based on SOFC/GT/$CO_2$ and ORC combined cycle power generation and LNG cold energy utilization are shown in Table 1 and Table 2, respectively.

TABLE 1

Initial conditions of a system

| Item | Value | Item | Value |
|---|---|---|---|
| Air flow rate | 6.618 mol/s | Inlet pressure of an $SCO_2$ turbine | 20 MPa |
| Fuel flow rate | 0.514 mol/s | Outlet pressure of the $SCO_2$ turbine | 7.4 MPa |
| Ambient pressure | 0.101325 MPa | Inlet pressure of a $TCO_2$ turbine | 20 MPa |
| Ambient temperature | 298.15 K | Outlet pressure of the $TCO_2$ turbine | 1.4 MPa |
| Pressure ratio of a water pump | 9 | Outlet temperature of a $TCO_2$ condenser | 225.15 K |
| Pressure ratio of an air compressor | 9 | LNG temperature | 111.68 K |
| Adiabatic internal efficiency of the air compressor | 0.75 | LNG pressure | 0.16968 MPa |
| Steam/carbon ratio | 2 | Isentropic efficiency of the $SCO_2$ turbine | 0.9 |
| Fuel utilization | 0.85 | Isentropic efficiency of the $TCO_2$ turbine | 0.85 |
| Temperature of SOFC inlet | 700 K | Isentropic efficiency of an $SCO_2$ compressor | 0.89 |
| An area of a single cell of the SOFC | 0.027 m² | Adiabatic internal efficiency of a $TCO_2$ pump | 0.8 |
| A number of single cells of the SOFC | 5000 | Outlet pressure of an R1150 turbine | 0.11 MPa |
| Efficiency of an inverter | 0.98 | Outlet temperature of an R1150 condenser | 170.15 K |
| Heat transfer temperature difference of a waste heat boiler | 10 K | Isentropic efficiency of the R1150 turbine | 0.89 |
| Inlet temperature of the $SCO_2$ compressor | 295.15 K | Adiabatic internal efficiency of an R1150 pump | 0.8 |

TABLE 2

System simulation result

| Parameter | Value |
|---|---|
| Working voltage of an SOFC | 0.6653 V |
| Working temperature of the SOFC | 1142 K |
| Electric generation of the SOFC | 211.000 kW |
| Electric generation of a gas turbine | 126.934 kW |
| Electric generation of an $SCO_2$ turbine | 17.702 kW |
| Electric generation of a $TCO_2$ turbine | 19.739 kW |
| Electric generation of an R1150 turbine | 26.426 kW |
| Net electric generation of a system | 331.280 kW |
| Cold energy capacity of dry ice | 14.987 kW |
| Cold energy capacity of ice | 14.692 kW |
| Cold energy capacity of a low-temperature cold store | 20.360 kW |
| Cold energy capacity of an air conditioning | 11.066 kW |
| Supplied heat | 58.563 kW |
| Supply of natural gas to the outside | 8.594 mol/s |
| Reduced $CO_2$ emission | 0.514 mol/s |
| Power generation efficiency of the SOFC | 51.24% |
| Comprehensive energy efficiency of the system | 82.79% |
| Net power generation efficiency of the system | 80.45% |
| Total exergy efficiency of the system | 63.21% |

It may be known from Table 2 that under rated conditions, the net power generation efficiency of the system of the present invention is 80.45%, the comprehensive energy utilization rate of the system is 82.79%, the total exergy efficiency of the system is 63.21%, the net electric generation of the system is 331.280 kW, the cold energy capacity for low-temperature cold store is 20.360 kW, the cold energy capacity for air conditioning is 11.066 kW, the supplied heat is 58.563 kW, the cold energy capacity of the dry ice is 14.987 kW, the cold energy capacity of the ice is 14.692 kW, supply of natural gas to the outside is 8.594 mol/s, and the reduced CO2 emission is 0.514 mol/s, achieving efficient and cascade utilization of the energy and low carbon emission. If the system runs 5000 hours/year, 407.088 tons of emitted $CO_2$ may be reduced per year.

The foregoing descriptions are merely exemplary embodiments of this application but are not intended to limit this application. This application may include various modifications and changes for a person skilled in the art. Any modification, equivalent replacement, or improvement made without departing from the spirit and principle of this application shall fall within the protection scope of this application.

What is claimed is:

1. A combined cooling, heating and power system based on solid oxide fuel cell (SOFC) and gas turbine (GT) and CO2 (SOFC/GT/CO2) and organic Rankine cycle (ORC) combined cycle power generation and liquefied natural gas (LNG) cold energy utilization, comprising:
    an SOFC/GT hybrid power generation subsystem, a CO2 cycle subsystem, an ORC cycle subsystem, an LNG cold energy utilization subsystem, a heating subsystem, and a CO2 capture and air conditioning cooling subsystem, wherein the CO2 cycle subsystem comprises a supercritical CO2 (SCO2) cycle and a transcritical CO2 (TCO2) cycle;
    the SCO2 cycle comprises a waste heat boiler, a first electric generator, an SCO2 turbine, a gas cooler, and an SCO2 compressor;
    the waste heat boiler is configured to receive an exhaust from a first preheater of the SOFC/GT hybrid power generation subsystem to heat a first working fluid CO2 in the SCO2 cycle and produce a flue gas;
    in the SCO2 cycle, the SCO2 turbine is configured to receive the first working fluid CO2 in the SCO2 cycle that has been heated by the waste heat boiler and do work to drive the first electric generator to generate electricity;
    the gas cooler is configured to receive the first working fluid CO2 from the SCO2 turbine to heat a second working fluid CO2 in the TCO2 cycle;
    the SCO2 compressor is configured to receive the first working fluid CO2 from the gas cooler in the SCO2 cycle for compression;
    the waste heat boiler is configured to receive the first working fluid CO2 discharged from the SCO2 compressor for reheating so that one supercritical CO2 cycle is completed;
    the CO2 capture and air conditioning cooling subsystem comprises an evaporator, a first separator, a first air conditioning cooler, a first heat exchanger, a second separator, a dry ice container, a first condenser, a second heat exchanger, a second air conditioning cooler, and a first ice container;
    the evaporator is configured to receive the flue gas from the waste heat boiler;
    the first separator is configured to:
        receive the flue gas discharged from a flue gas side of the evaporator, and
        separate a first flow of water from the flue gas;
    the first air conditioning cooler is configured to receive the first flow of water to provide cooling for users;
    the first heat exchanger is configured to:
        receive the flue gas from the first separator, cool the flue gas by a working fluid R1150, and condense a CO2 gas in the flue gas into dry ice;
    the second separator is configured to:
        receive the flue gas discharged from the first heat exchanger, and
        separate the flue gas from the dry ice;
    the dry ice container is configured to store the dry ice; and
    the first condenser is configured to receive the flue gas discharged from the second separator to condense the second working fluid CO2 in the TCO2 cycle.

2. The combined cooling, heating and power system according to claim 1, wherein the SOFC/GT hybrid power generation subsystem comprises an air compressor, the first preheater, an SOFC, a second preheater, a water pump, a third preheater, a mixer, an inverter, an afterburner, a gas turbine, and a second electric generator, wherein
    the air compressor and the third preheater are connected in series and then are connected to a cathode of the SOFC;
    the water pump is connected to the first preheater, the first preheater and the second preheater are connected to the mixer, and the mixer is connected to an anode of the SOFC;
    the SOFC is connected to the inverter to convert direct current to alternating current;
    the afterburner is configured to receive an exhaust from the cathode and an exhaust from the anode of the SOFC;
    the gas turbine is configured to receive a high-temperature exhaust from the afterburner such that the high-temperature exhaust expands through the gas turbine to do work to drive the second electric generator to generate electricity; and
    the third preheater, the second preheater, and the first preheater are configured to receive an exhaust from the gas turbine in sequence to preheat air, fuel, and a second flow of water, respectively.

3. The combined cooling, heating and power system according to claim 1, wherein
the $TCO_2$ cycle comprises the gas cooler, a $TCO_2$ turbine a second electric generator, the first condenser, a second condenser, a third condenser, a working fluid $CO_2$ pump, and a precooler;
the gas cooler is configured to heat the second working fluid $CO_2$ in the $TCO_2$ cycle;
the $TCO_2$ turbine is configured to receive the second working fluid $CO_2$ in the $TCO_2$ cycle that has been heated by the gas cooler and do work to drive the second electric generator to generate electricity;
the first condenser, the second condenser, and the third condenser are configured to condense an exhaust discharged from the $TCO_2$ turbine;
the first condenser, the second condenser, and the third condenser are connected to the working fluid $CO_2$ pump, and the precooler is configured to receive the second working fluid $CO_2$ in the $TCO_2$ cycle that is discharged from an outlet of the working fluid $CO_2$ pump and cool a low-temperature cold store; and
the gas cooler is configured to receive the second working fluid $CO_2$ in the $TCO_2$ cycle that is discharged from an outlet of the precooler and heat the second working fluid $CO_2$ in the $TCO_2$ cycle by the first working fluid $CO_2$ in the $SCO_2$ cycle, so that one transcritical $CO_2$ cycle is completed.

4. The combined cooling, heating and power system according to claim 1, wherein the heating subsystem comprises a third heat exchanger disposed between the waste heat boiler and the evaporator; and the third heat exchanger is configured to receive the flue gas discharged from the waste heat boiler to provide heating for users.

5. The combined cooling, heating and power system according to claim 1, wherein
the working fluid R1150 is used in the ORC cycle subsystem;
the ORC cycle subsystem comprises a third heat exchanger, the evaporator, an R1150 turbine, a second electric generator, an R1150 condenser, a working fluid R1150 pump, and the first heat exchanger;
the third heat exchanger disposed between the waste heat boiler, and the evaporator;
the evaporator is configured to receive the flue gas discharged from an outlet of the third heat exchanger to heat the working fluid R1150 in the ORC cycle;
the R1150 turbine is configured to receive the working fluid R1150 discharged from an outlet at a working fluid R1150 side of the evaporator and do work to drive the second electric generator to generate electricity;
the R1150 condenser is configured to condense an exhaust discharged from the R1150 turbine;
the R1150 condenser is connected to the working fluid R1150 pump, and the first heat exchanger is configured to receive the working fluid R1150 discharged from the working fluid R1150 pump; and
the evaporator is configured to receive the working fluid R1150 discharged from the first heat exchanger to heat and evaporate the working fluid R1150, so that one working fluid R1150 cycle is completed.

6. The combined cooling, heating and power system according to claim 1, wherein
the second heat exchanger is configured to receive the flue gas discharged from the first condenser and condense a second flow of water to generate ice; and
the first ice container is configured to store the ice; and
the second air conditioning cooler is configured to:
receive the flue gas discharged from the second heat exchanger to produce cooling, and discharge the flue gas into the atmosphere.

7. The combined cooling, heating and power system according to claim 1, wherein
the LNG cold energy utilization subsystem comprises an LNG tank, an LNG pump, an R1150 condenser, a second condenser, a third condenser, a third heat exchanger, a second ice container, and a third air conditioning cooler;
the LNG tank is connected to the LNG pump,
the LNG cold energy utilization subsystem is configured to:
(i) divide LNG from an outlet of the LNG pump into a first part and a second part such that:
the first part enters the R1150 condenser and the third condenser in sequence, and is reverted to a first natural gas by absorbing heat in the R1150 condenser and the third condenser, and
the second part enters the second condenser and is reverted to a second natural gas by absorbing heat in the second condenser; and
(ii) merge the first natural gas from the first part and the second natural gas from the second part to form a merged natural gas after the first natural gas from the first part flows out of the third condenser and the second natural gas from the second part flows out of the second condenser;
the third heat exchanger is configured to receive the merged natural gas and form ice by condensing a second flow of water;
the second ice container is configured to store the ice;
the third air conditioning cooler is configured to receive the merged natural gas discharged from the third heat exchanger to produce cooling; and
the combined cooling, heating and power system is configured to:
feed a part of the merged natural gas discharged from the third air conditioning cooler into a second preheater as a fuel of an SOFC for preheating, and
supply a remaining part of the merged natural gas discharged from the third air conditioning cooler to a gas network.

8. The combined cooling, heating and power system according to claim 1, wherein
the dry ice container is capable of providing the dry ice to users,
the second heat exchanger and a third heat exchanger are configured to store cold energy by making a first ice and a second ice, respectively, and
the first ice container and a second ice container are configured to store the first ice and the second ice, respectively, so that the first ice and the second ice can be provided to users.

* * * * *